US011264860B2

(12) United States Patent
Zhu et al.

(10) Patent No.: US 11,264,860 B2
(45) Date of Patent: Mar. 1, 2022

(54) MOTOR

(71) Applicant: Robert Bosch GmbH, Stuttgart (DE)

(72) Inventors: Tao Zhu, Shanghai (CN); Shi Deng, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 16/607,350

(22) PCT Filed: Apr. 26, 2017

(86) PCT No.: PCT/CN2017/081958
§ 371 (c)(1),
(2) Date: Oct. 22, 2019

(87) PCT Pub. No.: WO2018/195788
PCT Pub. Date: Nov. 1, 2008

(65) Prior Publication Data
US 2020/0052544 A1 Feb. 13, 2020

(51) Int. Cl.
*H02K 5/18* (2006.01)
*H02K 11/21* (2016.01)
(Continued)

(52) U.S. Cl.
CPC ............... *H02K 5/18* (2013.01); *H02K 5/20* (2013.01); *H02K 9/06* (2013.01); *H02K 11/21* (2016.01); *H02K 24/00* (2013.01)

(58) Field of Classification Search
CPC ............ H02K 5/18; H02K 24/00; H02K 9/10; H02K 9/14
(Continued)

(56) References Cited

U.S. PATENT DOCUMENTS 3,226,580 A * 12/1965 Oehlrich .................. H02K 9/14
310/57
5,111,095 A * 5/1992 Hendershot .......... H02K 19/103
174/DIG. 19
(Continued)

FOREIGN PATENT DOCUMENTS

CN  201839175   5/2011
CN  206117387   4/2017
(Continued)

OTHER PUBLICATIONS

Kakiuchi (JP 05049216 A) English Translation (Year: 1993).*
(Continued)

*Primary Examiner* — Tulsidas C Patel
*Assistant Examiner* — Robert E Mates
(74) *Attorney, Agent, or Firm* — Michael Best & Friedrich LLP

(57) ABSTRACT

The present invention relates to an electric motor comprising a casing on which a plurality of heat dissipating fins extending in a longitudinally direction are disposed along a circumferential direction to form a longitudinally extending cooling airflow passage between adjacent heat dissipating fins; a first end cap and a second end cap attached to the casing at the ends to form a substantially closed interior space; a rotating shaft rotatably supported by the first end cap and the second end cap; a rotor positioned within in the internal space and mounted to the rotating shaft; and a stator positioned within in the internal space, surrounding the rotor and disposed adjacent to the casing. The electric motor further comprises an airflow guiding device disposed on the heat dissipating fins and allowing the heat dissipating fins to expose partially to the surrounding environment in the circumferential direction of the casing, the airflow guiding device is configured to divert the cooling airflow that tends to escape from the cooling airflow passages to the surround-
(Continued)

ing environment in the middle of the cooling airflow passages back into the cooling airflow passages. According to the present invention, it is possible to cool evenly the electric motor and improve the heat dissipation efficiency.

9 Claims, 4 Drawing Sheets

(51) Int. Cl.
  *H02K 5/20* (2006.01)
  *H02K 9/06* (2006.01)
  *H02K 24/00* (2006.01)
(58) Field of Classification Search
  USPC .......................................................... 181/283
  See application file for complete search history.

(56) References Cited

U.S. PATENT DOCUMENTS

| | | | | |
|---|---|---|---|---|
| 2003/0121259 A1* | 7/2003 | Conrad | ................ | F02G 1/0435 60/508 |
| 2008/0084141 A1* | 4/2008 | Schueren | ............... | H02K 5/225 310/68 B |

FOREIGN PATENT DOCUMENTS

| | | | | | |
|---|---|---|---|---|---|
| DE | 3628093 A1 | * | 4/1987 | ............... | H02K 5/15 |
| GN | 1304203 A | | 7/2001 | | |
| JP | S4830019 A | | 4/1973 | | |
| JP | S55102362 U | | 7/1980 | | |
| JP | S6028456 U | | 2/1985 | | |
| JP | H03239142 A | | 10/1991 | | |
| JP | 0549216 | | 2/1993 | | |
| JP | 05049216 A | * | 2/1993 | | |
| JP | H08126246 A | | 5/1996 | | |
| JP | 2002218704 | | 8/2002 | | |
| JP | 2011101549 A | | 5/2011 | | |

OTHER PUBLICATIONS

Priebst (DE 3628093 A1) English Translation (Year: 1987).*
International Search Report for Application No. PCT/CN2017/081958 dated Jan. 29, 2018 (English Translation, 2 pages).

* cited by examiner

MOTOR

BACKGROUND OF THE INVENTION

This invention relates to electric motors, and in particular to the cooling of electric motors.

As a power of an electric motor used in an electric vehicle such as an electric motorcycle, an electric bicycle, and an electric car increases, effective cooling of the electric motor becomes more and more important. The maximum allowable operating temperature of an electric motor component such as a bearing, a rotary seal, a magnet, and a copper winding determines a maximum continuous power of the electric motor. When the electric motor operates, heat loss occurs in the stator and the rotor. Although the electric motor can be cooled by liquid, such electric motors are usually cooled by airflow in order to simplify its structure and reduce the cost. To this end, a plurality of heat dissipating fins extending in a longitudinal direction of the motor casing are generally disposed along a circumferential direction of the motor casing on the electric motor casing which is a heat transfer surface of the electric motor, and a cooling airflow passage extending in the longitudinal direction is formed between the adjacent heat dissipating fins. The cooling airflow exchanges heat with the heat dissipating fins as it flows along the cooling airflow passages, thereby removing heat from the heat dissipating fins and dissipating heat into the surrounding environment.

For an electric motor whose cooling airflow passages are completely open toward the surrounding environment, when the cooling airflow flows along the cooling airflow passages, the speed of the cooling airflow becomes lower and lower, and the cooling airflow may spread to the surrounding environment before it completely flows through the cooling airflow passages. This will cause a portion of the electric motor located downstream of the cooling airflow passages to be insufficiently cooled. In order to solve this problem, it has been proposed to provide a cylindrical shroud on the electric motor casing. The cylindrical shroud renders the cooling airflow passages to be formed as closed passages that are open only at both ends, thereby preventing the cooling airflow from spreading from the middle of the cooling airflow passages to the surrounding environment. However, such a cylindrical shroud prevents the external natural airflow from contacting the heat dissipating fins, reducing heat dissipation efficiency, especially when no forced cooling airflow flows through the cooling airflow passages.

Therefore, there is a need to improve the cooling of the existing electric motors.

SUMMARY OF THE INVENTION

It is an object of the present invention to overcome at least one of the above-mentioned deficiencies in the prior art and to provide an electric motor which is capable of both being cooled evenly and improving the heat dissipation efficiency.

To this end, according to an aspect of the invention, an electric motor is provided, comprising:

a casing on which a plurality of heat dissipating fins extending in a longitudinally direction are disposed along a circumferential direction to form a longitudinally extending cooling airflow passage between adjacent heat dissipating fins;

a first end cap and a second end cap attached to the casing at the ends to form a substantially closed interior space;

a rotating shaft rotatably supported by the first end cap and the second end cap;

a rotor positioned within in the internal space and mounted to the rotating shaft;

a stator positioned within in the internal space, surrounding the rotor and disposed adjacent to the casing;

characterized in that, the electric motor further comprises an airflow guiding device disposed on the heat dissipating fins and allowing the heat dissipating fins to expose partially to the surrounding environment in the circumferential direction of the casing, the airflow guiding device is configured to divert the cooling airflow that tends to escape from the cooling airflow passages to the surrounding environment in the middle of the cooling airflow passages back into the cooling airflow passages.

According to the airflow guiding device of the present invention, on one hand, the cooling airflow flows through the entire cooling airflow passages to effectively cool the portion of the electric motor located downstream of the cooling airflow passages too, and on the other hand, the heat dissipating fins expose partially to the surrounding environment in the circumferential direction of the casing, the external natural airflow can be in direct contact with the heat dissipating fins to improve heat dissipation efficiency.

DETAILED DESCRIPTION

Preferred embodiments of the present invention are described in detail below with reference to the examples. It should be understood by those skilled in the art that these exemplary embodiments are not intended to form a limit to the invention.

Figure 1:
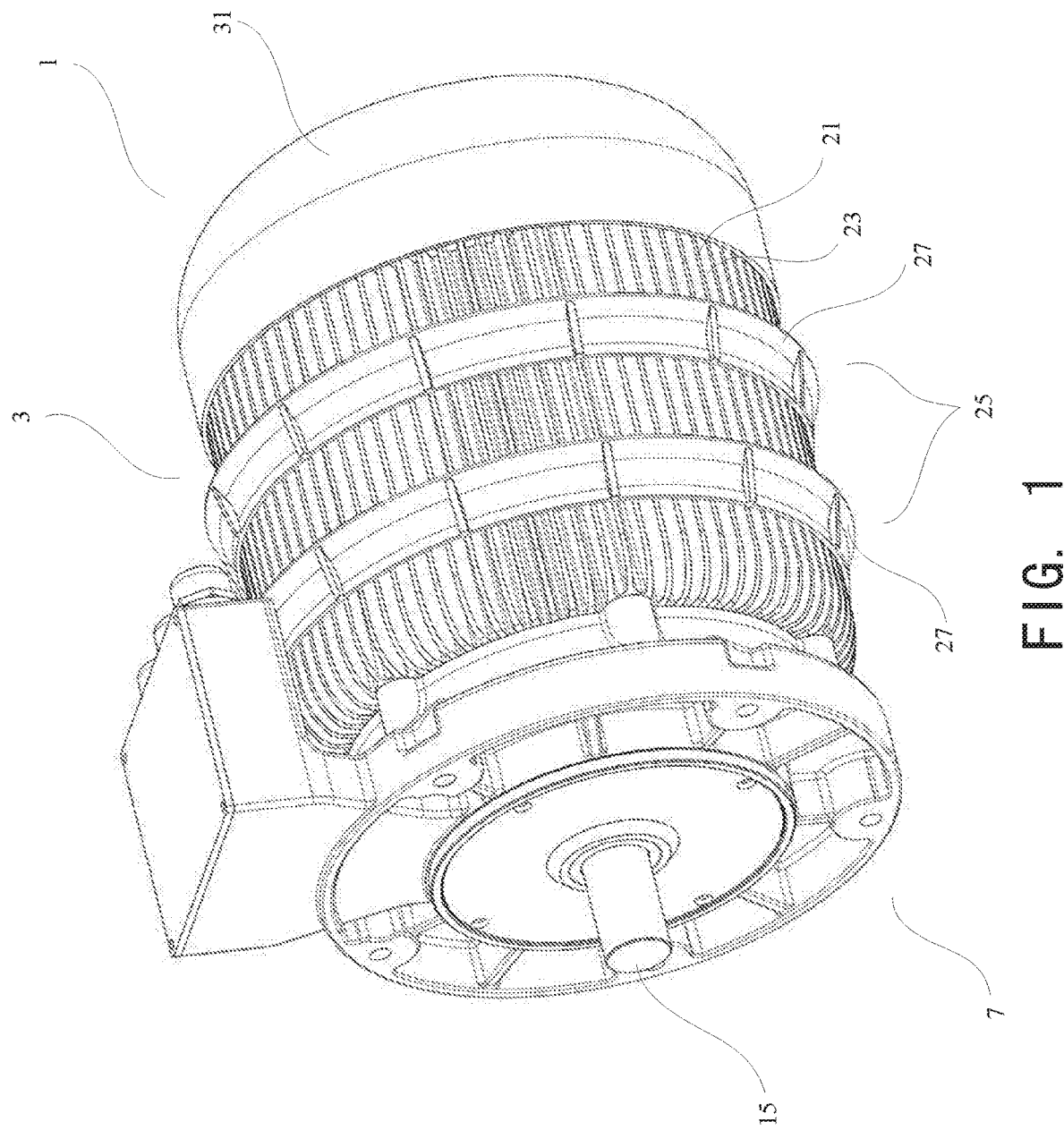
FIG. 1 is a schematic perspective view of an electric motor in accordance with a preferred embodiment of the present invention.
Figure 2:
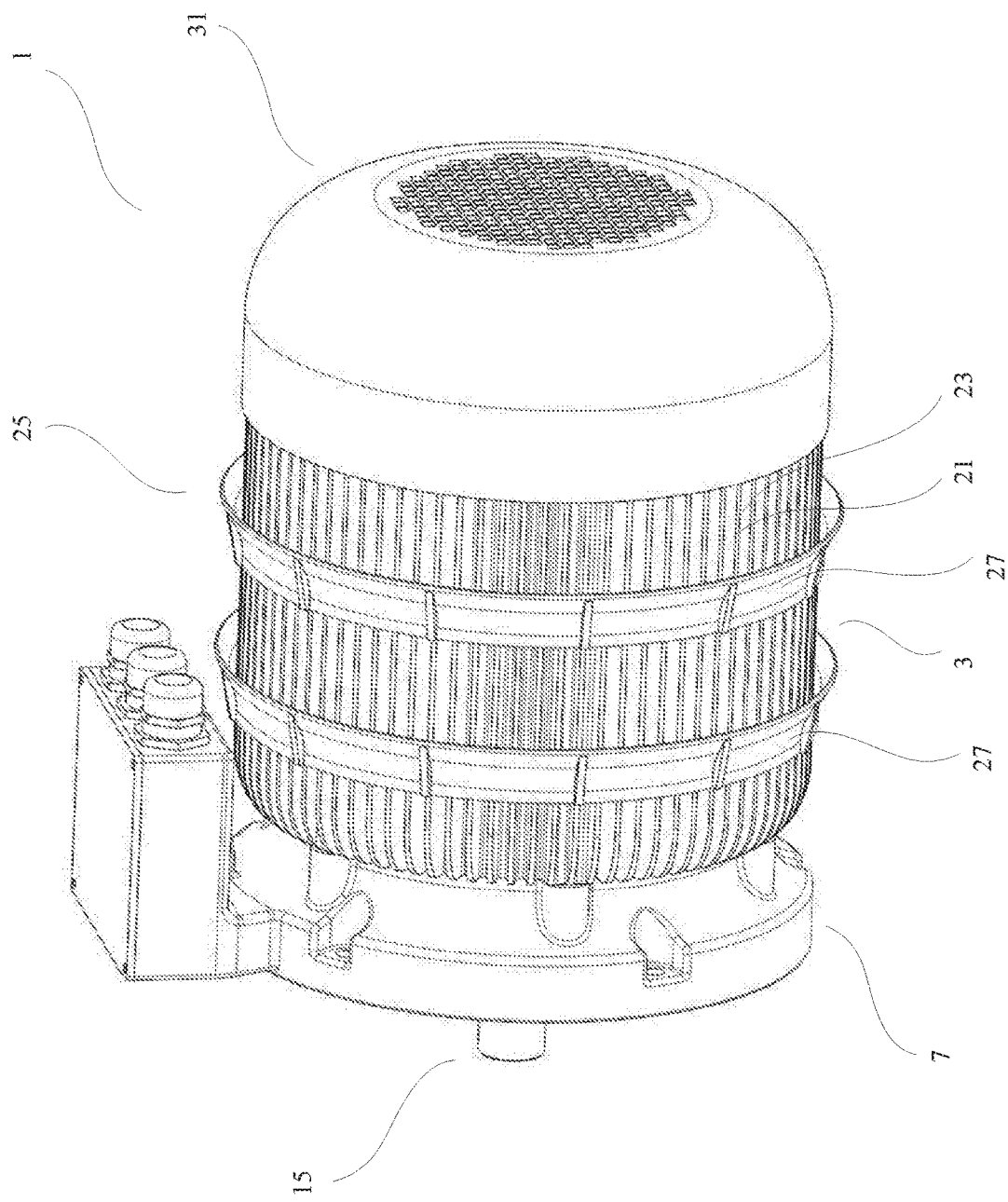
FIG. 2 is other schematic perspective view of an electric motor in accordance with a preferred embodiment of the present invention.
Figure 3:
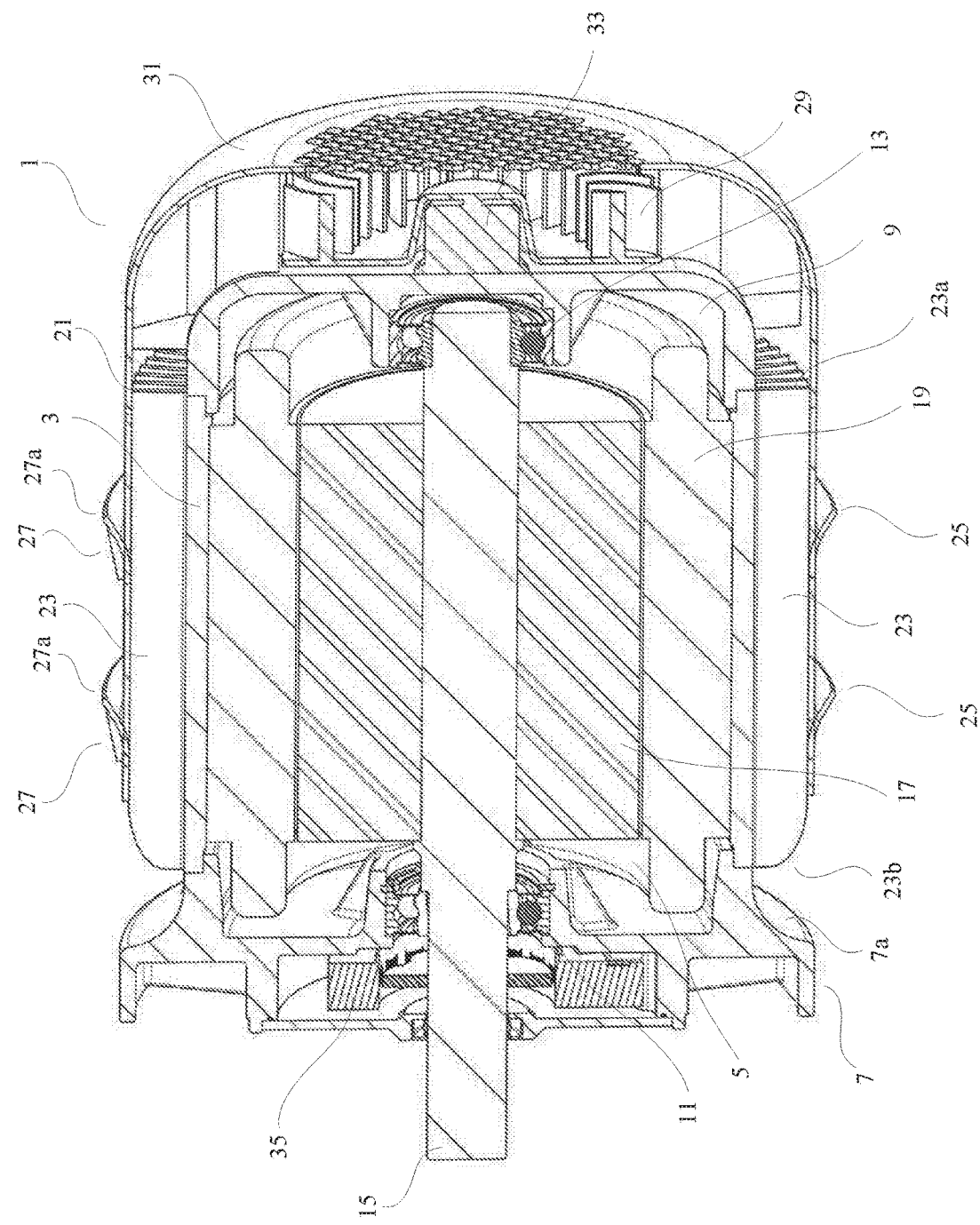
FIG. 3 is a schematic cross-sectional perspective view of an electric motor in accordance with a preferred embodiment of the present invention.

FIG. 1 is a schematic perspective view of an electric motor in accordance with a preferred embodiment of the present invention, FIG. 2 is other schematic perspective view of an electric motor in accordance with a preferred embodiment of the present invention, and FIG. 3 is a schematic cross-sectional perspective view of an electric motor in accordance with a preferred embodiment of the present invention. A junction box shown in FIG. 1 is omitted in FIGS. 2 and 3. As shown in FIGS. 1-3, an electric motor 1 according to a preferred embodiment of the present invention includes a casing 3, a first end cap 7 and a second end cap 9 attached to the casing 3 at the ends to form a substantially closed interior space 5, a rotating shaft 15 rotatably supported by a first bearing 11 disposed in the first end cap 7 and a second bearing 13 disposed in the second end cap 9, a rotor 17 positioned within in the internal space 5 and mounted to the rotating shaft 15 to rotate with the rotating shaft 15, and a stator 19 positioned within in the internal space 5, surrounding the rotor 17 and disposed adjacent to the casing 3.

A plurality of heat dissipating fins 21 extending in a longitudinal direction of the casing are disposed on the casing 3 in a circumferential direction, and a cooling airflow passage 23 extending in the longitudinal direction is formed between the adjacent heat dissipating fins 21. According to the present invention, the electric motor 1 further includes an airflow guiding device 25 disposed on the heat dissipating fins 21 and allowing the heat dissipating fins 21 to expose partially to the surrounding environment in the circumferential direction of the casing. The airflow guiding device 25 is used to divert the cooling airflow that tends to escape from the cooling airflow passages 23 to the surrounding environment in the middle of the cooling airflow passages 23 back into the cooling airflow passages 23, thereby preventing the cooling airflow from escaping from the cooling airflow passages 23 to the surrounding environment in the middle of the cooling airflow passages 23.

In the preferred embodiment illustrated in the drawings, the airflow guiding device 25 includes a plurality of airflow guiding rings 27 disposed on the heat dissipating fins 21 and spaced apart from each other along the longitudinal direction of the casing 3. Each of the airflow guiding rings 27 is formed as a ring member surrounding the casing 3. Preferably, the airflow guiding ring 27 slightly expands radially outwardly at an end 27a facing the inlets 23a of the cooling airflow passages 23 (for example, facing the right direction in FIGS. 1-4) to form a flared shape, thereby more advantageously diverting the cooling airflow that tends to escape from the cooling airflow passage 23 to the surrounding environment in the middle of the cooling airflow passage 23 back into the cooling airflow passages 23. In a preferred embodiment, two airflow guiding rings 27 are shown to be disposed on the heat dissipating fins 21 and spaced apart from each other along the longitudinal direction of the casing 3, but it should be understood that, depending on the size of the electric motor, one, three or more airflow guiding rings 27 may be provided on the heat dissipating fins 21. Further, the airflow guiding device 25 may be formed as an incomplete ring member, but a plurality of guiding plates spaced apart from each other along the circumferential direction of the casing 3. Each of the guiding plates partially clinging to the heat dissipating fins 21 slightly expands radially outwardly at a side facing the inlets of the cooling airflow passages 23 (for example, facing the right direction in FIGS. 1-4). Such a plurality of guiding plates spaced apart from each other may be provided at a plurality of locations along the longitudinal direction of the casing 3 as needed.

According to other embodiment, the airflow guiding device 25 may be an airflow guiding strip that is disposed spirally on the heat dissipating fins 21 along the casing 3. The spiral airflow guide strip is easier to manufacture and assemble. The pitch between adjacent threads of the spiral airflow guiding strip can be properly selected according to the size of the electric motor. Preferably, the spiral airflow guiding strip slightly expands radially outwardly at a side facing the inlets 23a of the cooling airflow passages 23 (for example, facing the right direction in FIGS. 1-4), thereby more advantageously diverting the cooling airflow that tends to escape from the cooling airflow passage 23 to the surrounding environment in the middle of the cooling airflow passage 23 back into the cooling airflow passages 23. It should be understood that the airflow guiding device 25 may be a discontinuously spiral airflow guiding strip, but includes a plurality of guiding plates spaced apart from each other along a spiral path. Each of the guiding plates partially clinging to the heat dissipating fins 21 may slightly expands radially outwardly at a side facing the inlets of the cooling airflow passages 23 (for example, in the right direction in FIGS. 1-4).

The airflow guiding device 25 comprises a plurality of guiding plates disposed along a circular path or a spiral path and spaced apart from each other have been described above, but it should also be understood that the airflow guiding device 25 may comprise a plurality of guiding plates disposed in any other suitable pattern or form and spaced apart from each other.

Although the electric motor according to the preferred embodiment of the present invention may use the natural airflow, for example the airflow generated by the movement of the electric motor relative to the surrounding environment when the electric motor is attached to the vehicle, as the forced cooling airflow, a cooling fan 29 may be mounted at the rear end cap (the second end cap 9 in the drawings) of the electric motor to generate the desired forced cooling airflow. It is also feasible that the cooling fan 29 is mounted at the front end cap. The cooling fan 29 can be covered by a cover 31 that is attached to the casing 3 and has through holes. The cooling fan 29 can be attached to the rotating shaft 15 to be driven by the electric motor 1. More preferably, the cooling fan 29 is driven by a further electric motor 33 separately provided to control the operation of the cooling fan 29 independently of the operation of the electric motor 1. Thus, when the electric motor 1 operates, the operation of the cooling fan 29 can be controlled as needed to achieve further energy saving. A resolver 35 attached to the rotating shaft 15 is further provided at the front end cap (the first end cap 7 in the drawings) of the electric motor to control the rotation of the electric motor 1. Further, in order to allow the airflow flowing through the cooling airflow passages 23 quickly and smoothly spread into the surrounding environment, the surface 7a of the end cap (the first end cap 7 in the drawings) facing the outlets 23b of the cooling airflow passages 23 is formed in an arc shape, thereby facilitating the cooling airflow that has undergone heat exchange to spread.

Figure 4:
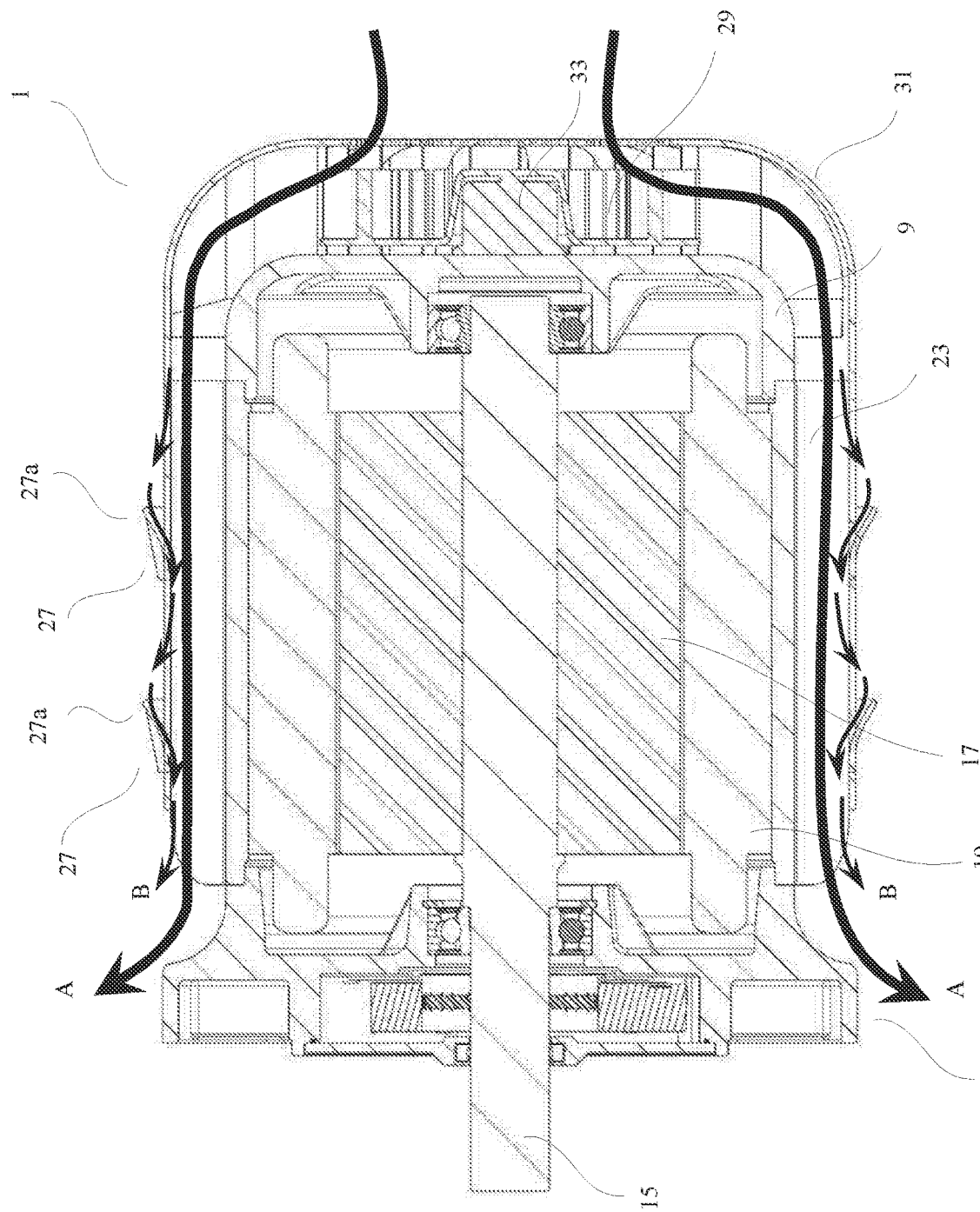
FIG. 4 is a schematic cross-sectional view of an electric motor in accordance with a preferred embodiment of the present invention, in which an airflow flow path is shown by arrows.

FIG. 4 is a schematic cross-sectional view of an electric motor in accordance with a preferred embodiment of the present invention, in which an airflow flow path is shown by arrows. In FIG. 4, a thick line arrow A indicates a desired ideal airflow flow path, and a thin line arrow B indicates an actual possible airflow flow path after the airflow guiding device of the present invention is attached. As is known, in the case where the electric motor is not provided with the airflow guiding device of the present invention, the cooling airflow may escape from the cooling airflow passages 23 to the surrounding environment in the middle of the cooling airflow passages 23. However, after the electric motor is provided with the airflow guiding device 25 of the present invention, the airflow guiding device 25 of the present invention diverts the cooling airflow which is about to escape back into the downstream cooling airflow passage 23 as indicated by the thin line arrows B when the cooling airflow tends to escape from the cooling airflow passages 23 to the surrounding environment in the middle of the cooling airflow passage 23. Thus, the actual possible airflow flow path is very close to the desired ideal airflow flow path indicated by the thick line arrow A. This ensures that the cooling airflow flows through the entire cooling airflow passages 23 and undergoes fully heat exchange with the heat dissipating fins 21 defining the cooling airflow passages 23, thereby effectively cooling the portion of the electric motor 1 located downstream of the cooling airflow passages 23.

The airflow guiding device according to the present invention does not completely cover the heat dissipating fins on the casing like the cylindrical shroud in the prior art. In this way, on one hand, the cooling airflow flows through the entire cooling airflow passages to effectively cool the portion of the electric motor located downstream of the cooling airflow passages too, and on the other hand, the external natural airflow can be in direct contact with the heat dissipating fins to improve heat dissipation efficiency. In some cases, according to the present invention, even only the external natural airflow in direct contact with the heat dissipating fins cools the electric motor without needing to generate the forced cooling airflow to flow through the cooling airflow passages, thereby further reducing energy consumption.

Although the invention has been described in detail for the purpose of illustration, it is to be understood that such detail is solely for that purpose and that the invention is not limited to the disclosed embodiments, but on the contrary, is intended to cover modifications and equivalent arrangements that are within the spirit and scope of the appended claims.

What is claimed is:

1. An electric motor (1) comprising:
   a casing (3) on which a plurality of heat dissipating fins (21) extending in a longitudinal direction of the casing are disposed along a circumferential direction of the casing to form longitudinally extending cooling airflow passages (23) between adjacent heat dissipating fins (21);
   a first end cap (7) and a second end cap (9) attached to the casing (3) at ends of the casing to form a substantially closed internal space (5);
   a rotating shaft (15) rotatably supported by the first end cap (7) and the second end cap (9);
   a rotor (17) positioned within the internal space (5) and mounted to the rotating shaft (15);
   a stator (19) positioned within the internal space (5), surrounding the rotor (17) and disposed adjacent to the casing (3); and
   an airflow guiding device (25) disposed on the heat dissipating fins (21) and allowing the heat dissipating fins (21) to be partially exposed to a surrounding environment,
   wherein the airflow guiding device (25) is configured to divert, back into the cooling airflow passages (23), cooling airflow that has escaped to the surrounding environment from the cooling airflow passages (23), and
   wherein the airflow guiding device (25) is positioned completely radially outside, with respect to the rotating shaft (15), of the plurality of heat dissipating fins (21),
   wherein the airflow guiding device (25) comprises at least two airflow guiding rings (27) disposed on the heat dissipating fins (21) and spaced apart from each other along the longitudinal direction of the casing (3), and
   wherein the airflow guiding rings (27) each expand radially outwardly at an end facing inlets (23a) of the cooling airflow passages (23).

2. The electric motor (1) according to claim 1, wherein the airflow guiding device (25) extends circumferentially around the casing (3) and comprises a plurality of guiding plates.

3. The electric motor (1) according to claim 2, wherein the guiding plates each expand radially outwardly at a side facing inlets (23a) of the cooling airflow passages (23).

4. The electric motor (1) according to claim 1, wherein a surface (7a) of one of the end caps facing outlets (23b) of the cooling airflow passages (23) is formed as an arc surface.

5. The electric motor (1) according to claim 1, wherein the electric motor (1) further comprises a cooling fan (29) mounted at the first end cap (7) or the second end cap (9), the cooling fan (29) being driven by the electric motor (1) or a further electric motor (33).

6. The electric motor (1) according to claim 1, wherein the electric motor (1) further comprises a resolver (35) for controlling rotation of the electric motor (1).

7. The electric motor (1) according to claim 1, wherein the airflow guiding device (25) extends across at least two of the longitudinally extending cooling airflow passages (23).

8. The electric motor (1) according to claim 1, wherein the airflow guiding device (25) encircles all of the plurality of heat dissipating fins (21).

9. The electric motor (1) according to claim 2, wherein the guiding plates are disposed along a direction circumferential to a centerline of the casing (3).

* * * * *